D. G. ROOS.
BONNET SILL AND FENDER CONSTRUCTION.
APPLICATION FILED APR. 12, 1919.
1,326,879.
Patented Dec. 30, 1919.
2 SHEETS—SHEET 1.
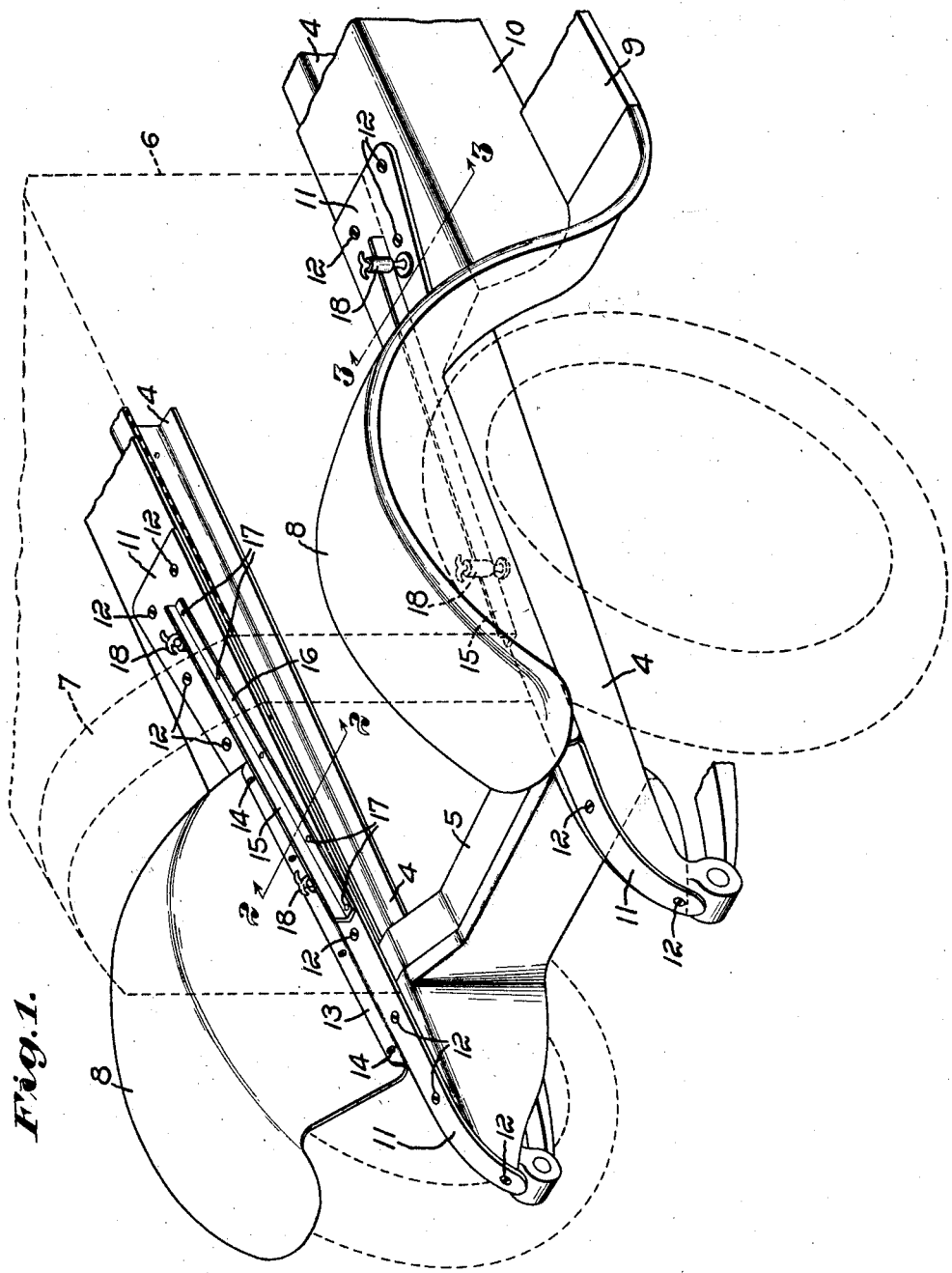
Inventor:
Delmar G. Roos,

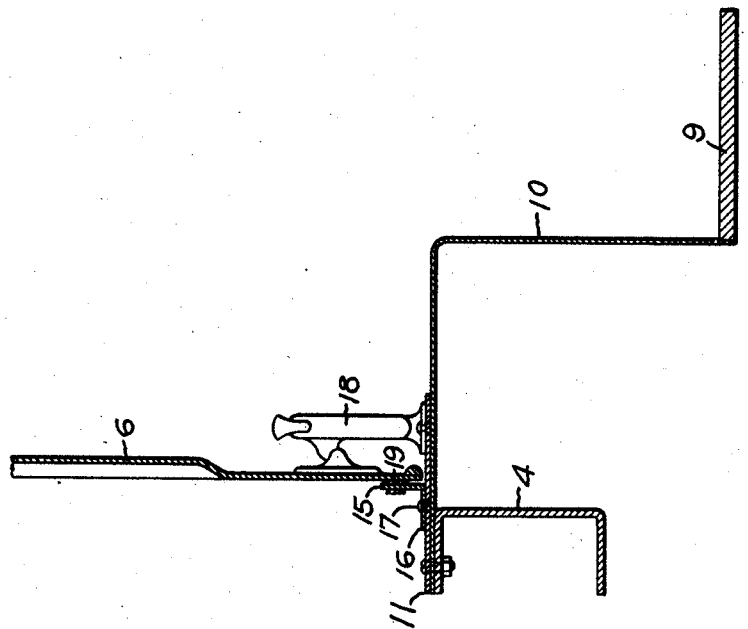
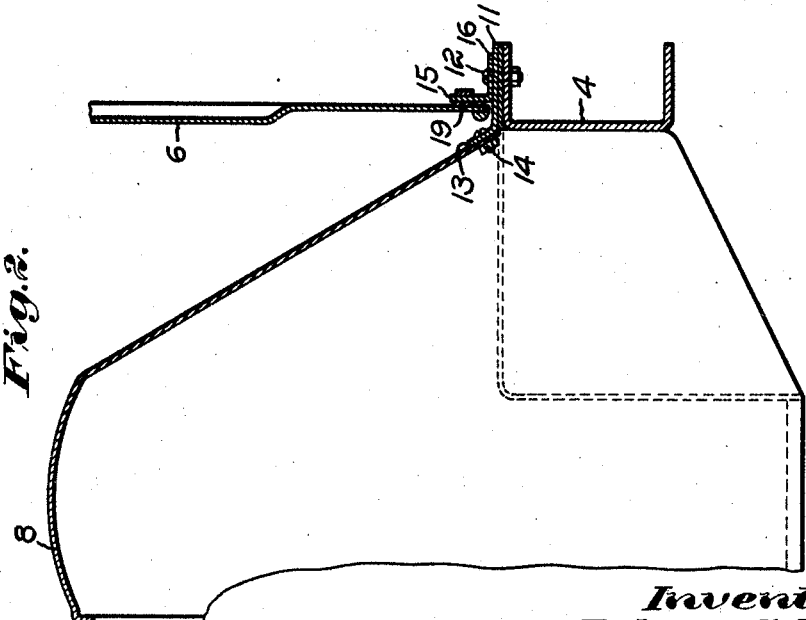

UNITED STATES PATENT OFFICE.

DELMAR G. ROOS, OF BRIDGEPORT, CONNECTICUT, ASSIGNOR TO THE LOCOMOBILE COMPANY OF AMERICA, OF BRIDGEPORT, CONNECTICUT, A CORPORATION OF WEST VIRGINIA.

BONNET-SILL AND FENDER CONSTRUCTION.

1,326,879.

Specification of Letters Patent.

Patented Dec. 30, 1919.

Application filed April 12, 1919. Serial No. 289,721.

*To all whom it may concern:*

Be it known that I, DELMAR G. Roos, a citizen of the United States, and a resident of Bridgeport, county of Fairfield, and State of Connecticut, have invented an Improvement in Bonnet-Sill and Fender Constructions, of which the following description, in connection with the accompanying drawings, is a specification, like characters on the drawings representing like parts.

This invention relates to motor vehicles, and is more particularly concerned with an improved bonnet sill and fender construction. The invention will be best understood by reference to the following description, when taken in connection with the accompanying drawings of a portion of a motor car embodying the invention, while its scope will be more particularly pointed out in the appended claims.

In the drawings:

Figure 1 is a perspective view of the front end of a motor car having a bonnet sill and fender construction exemplifying the invention;

Fig. 2 is a cross-sectional view on line 2—2 of Fig. 1; and

Fig. 3 is a cross-sectional view on the line 3—3 of Fig. 1.

Referring to the drawings, and to the embodiment of my invention which is illustrated therein, I have selected for exemplification a motor car having a frame comprising a pair of usual longitudinal channel members 4, connected to each other by a transverse member 5. A body or hood 6 and radiator 7, represented in dotted lines in Fig. 1, provide a housing for the usual engine and its accessories. Fenders 8 are provided for the front wheels, and usual running boards 9 are joined to the frame by dust-guards 10.

Superimposed upon the channel members 4 (see Figs. 2 and 3), are bonnet sills 11, which preferably extend from the front ends of the members 4 to the rear end of the bonnet 6, and preferably these sills are widened laterally toward the rear, to correspond with the bonnet which is wider at its rear end than at the front. Preferably, the horizontal webs of the dust-shields 10 extend between the channel members 4 and the bonnet sills 11, as shown in Fig. 3. The sills may be suitably secured to the frame members and to the dust-shields by bolts 12.

The bonnet sills are provided with upwardly and outwardly projecting flanges 13, to which the fenders 8 are suitably secured, as by bolts 14, the removal of which permits the fenders to be dismounted without disturbing the bonnet sills. The latter are also provided with vertical flanges 15 which may be and are herein formed as the flanges of separate angle-irons having horizontal flanges 16, suitably secured to the sills as by rivets 17. The flanges 15 provide abutments for the side walls of the bonnet 6, while usual bonnet hooks 18 secured to the bonnet sills hold the bonnet in place in a well-known manner.

Suitable anti-squeak material 19, interposed between the flanges 15 and the side walls of the bonnet, prevents rattling and squeaking of the bonnet sides against the flanges.

Having thus described one embodiment of my invention, but without limiting myself thereto, what I desire by Letters Patent to secure is:—

1. In a motor vehicle, the combination of a frame, a bonnet, a pair of bonnet sills secured to said frame, and a pair of fenders secured to said bonnet sills independently of the attachment of said bonnet sills to said frame.

2. In a motor vehicle, the combination of a frame, a bonnet, a pair of bonnet sills secured to said frame and provided with flanges, and a pair of fenders secured to said flanges, respectively.

3. In a motor vehicle, the combination of a frame, a bonnet, a pair of bonnet sills secured to said frame and provided with upwardly projecting flanges, and a pair of fenders secured to said flanges, respectively.

4. In a motor vehicle, the combination of a frame, a bonnet, a pair of bonnet sills secured to said frame and provided with upwardly and outwardly projecting flanges, and a pair of fenders having upwardly and outwardly projecting webs secured to said flanges, respectively.

5. In a motor vehicle, the combination of a frame, a bonnet having a pair of side walls, a pair of bonnet sills supported on said frame and provided with inner and outer flanges, said inner flanges being overlapped by said side walls, and a pair of fenders secured to said outer flanges, respectively.

6. In a motor vehicle, the combination of a frame, a bonnet having a pair of side walls, a pair of bonnet sills supported on said frame and provided with inner and outer flanges, said inner flanges being overlapped on their outer faces by said side walls, and a pair of fenders secured to the outer faces of said outer flanges, respectively.

7. In a motor vehicle, the combination of a frame having a pair of side members, a pair of dust shields superimposed upon said side members, a pair of bonnet sills superimposed upon said dust shields, and provided with flanges, a pair of fenders secured to said flanges, a bonnet having a pair of side walls, and means to secure said side walls to said sills.

8. In a motor vehicle, the combination of a frame having a pair of side members, a pair of dust shields superimposed upon said side members, a pair of bonnet sills superimposed upon said dust shields and provided with flanges, a pair of fenders secured to said flanges and to said dust shields, a bonnet having a pair of side walls, and means to secure said side walls to said sills.

9. In a motor vehicle, the combination of a frame having a pair of side members, a pair of dust shields having generally horizontal flanges superimposed upon said side members and generally vertical depending flanges, a pair of bonnet sills superimposed upon said horizontal flanges and provided with flanges, a pair of fenders secured to said vertical flanges of said dust shields and to the flanges of said bonnet sills, a bonnet having a pair of side walls, and means to secure said side walls to said bonnet sills.

In testimony whereof, I have signed my name to this specification.

DELMAR G. ROOS.